Figure 1D:
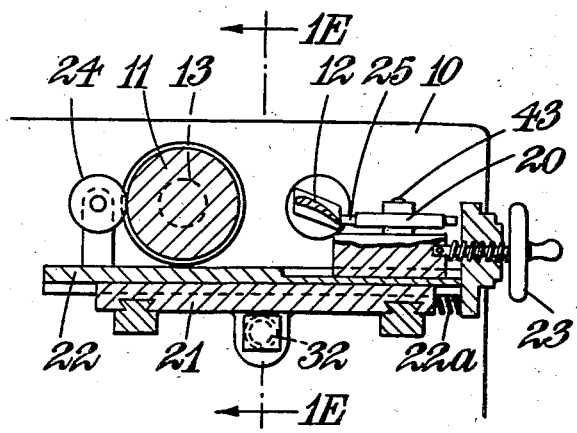

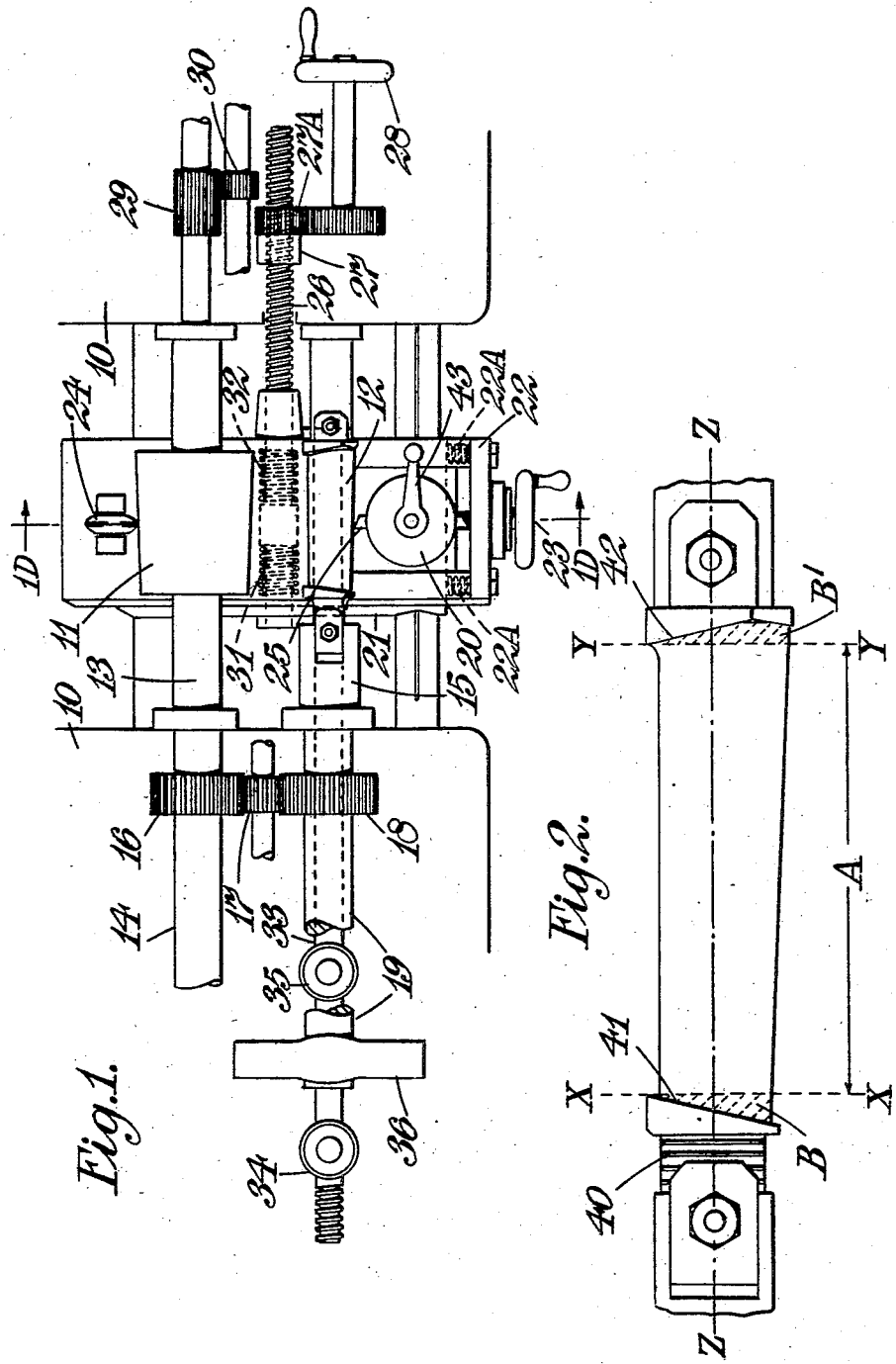

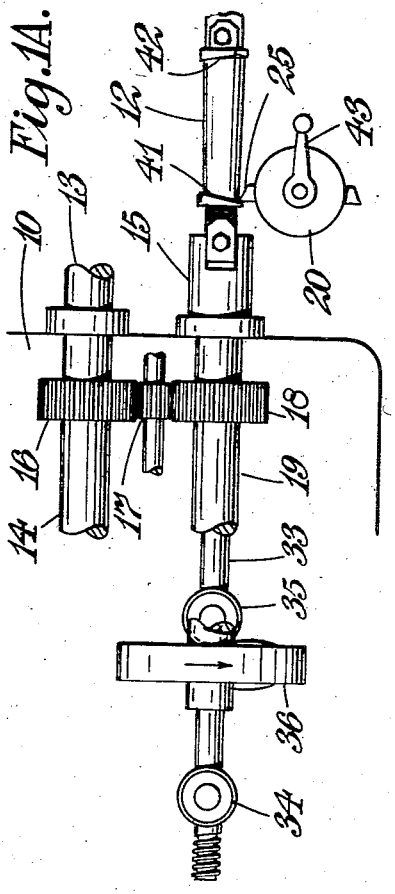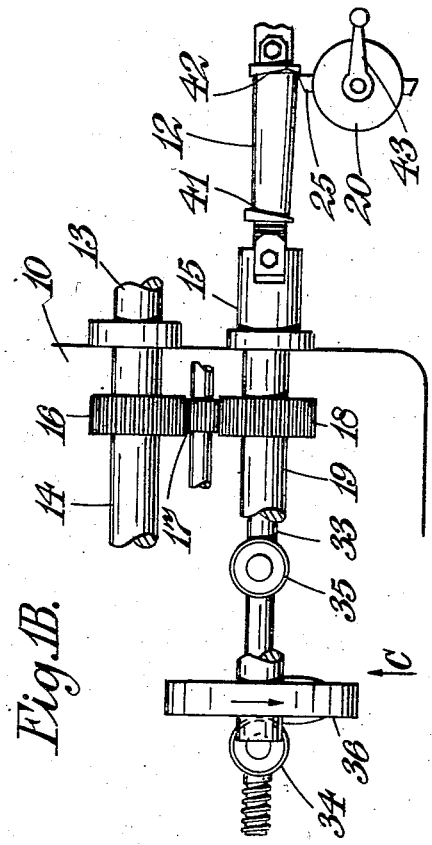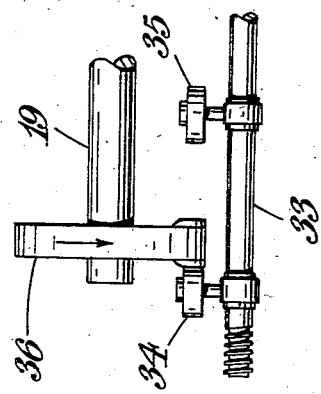

March 25, 1958  J. SMEDLEY  2,827,816
PROFILE COPYING MACHINE
Filed March 25, 1954  3 Sheets-Sheet 3

INVENTOR
John Smedley

BY
Mawhinney & Mawhinney
ATTORNEYS

United States Patent Office 2,827,816
Patented Mar. 25, 1958

2,827,816

PROFILE COPYING MACHINE

John Smedley, Chellaston, England, assignor to Rolls-Royce Limited, Derby, England, a British company Application March 25, 1954, Serial No. 418,716

Claims priority, application Great Britain April 7, 1953

5 Claims. (Cl. 82—19)

This invention relates to machining apparatus and is specifically concerned with that type of apparatus in which the shape of a master profile is reproduced by correlating the relative movements of a cutting tool and workpiece with the relative movements of a follower and the master profile, and in which both the master profile and workpiece are rotatably driven whereby a turning operation is performed on the workpiece by the cutting tool to produce a shape defined by the master profile. Such machining apparatus will be referred to hereinafter as cam turning apparatus.

The invention has an important application to apparatus for machining the outside aerofoil shape of axial-flow turbine and compressor blading, in which a master profile is used for the repetition machining of such blading. The invention has for an object the provision of apparatus suitable for machining such blading having end walls, known as blade platforms, at their root ends or at their tips or at both their root ends and tips. When a series of blades are arranged in circumferential assembly, these platforms form a substantially continuous shroud for the blade roots and/or tips. Such blading is commonly referred to as "shrouded blading".

In the design of such blading it is in certain cases desirable that the surfaces of the platforms from which the profile portions of the blades project should in the circumferential assembly form a substantially frusto-conical shroud coaxial with the axis of the assembly. Such a frusto-conical shroud arrangement results in the surface of each platform from which the shroud is formed being inclined to a plane which is at right angles to the longitudinal axis of the associated profile portion of the blading. Such platforms will be referred to as "inclined platforms".

The machining of turbine and compressor blading has hitherto been carried out by apparatus such as described above and it will be appreciated that in the production of blading having inclined platforms it has not hitherto been possible to machine the complete profile surface of the blade, there being triangular portions of the profile which have been separately machined.

It is thus an object of the present invention to provide improved cam turning apparatus for the machining of axial-flow compressor and turbine blading having inclined platforms whereby the separate machining step is rendered unnecessary.

According to the present invention in cam turning apparatus there is provided a tool carrier, first slide means for supporting the tool carrier for first movement towards and away from the axis of rotation of the workpiece, said first movement being effected under control of the follower and master profile, second slide means for supporting the tool carrier for second movement substantially parallel to the axis of rotation of the workpiece, manual or automatic drive means connected to control in part said second movement, and cam and follower means adapted to produce in part said second movement by effecting a cycle of movements of the tool carrier in said second slide means on each revolution of the workpiece.

In machining the outside aerofoil shape of turbine and compressor blading of the kind having inclined platforms, the cam and follower means are arranged to be operative adjacent the platforms to move the tool carrier cyclically in the second slide means so that a tool mounted in the carrier follows a path which in the region of the platform is substantially parallel to the surface of the platform, whereby the whole of the profile extending from the platform is machined. The major portion of the blade profile, that is the portion which extends beyond a plane drawn at right angles to the axis of rotation of the blade in the machining operation and containing the inner edge of the platform, can be machined without cyclic movement of the tool being required, and thus the cam means and follower means may be inoperative whilst machining this portion of the blade. Where the blading has platform formations at each end, and each of these platforms is of the inclined type, the cam and follower means may be adapted to cause the appropriate cyclic movement of the tool carrier in the second slide means adjacent each end of the movement in said second slide means produced manually or automatically, whereby each end portion of the blading profile is completely machined.

According to a preferred feature of this invention, it is arranged that the cyclic movement of the tool carrier in said second slide means is transmitted to the follower which co-operates with the master profile. In this manner, the master profile may be shaped to control the form of the portion of the blading lying adjacent the platform which differs from the profile of the portion lying beyond the plane above mentioned.

According to another preferred feature of this invention, the manual or automatic drive means for controlling in part the movement of the tool carrier in the second slide means includes a resilient connection, and the cam and follower means effects the cyclic movement of the tool carrier in the second slide means against the restraint of said resilient connection.

According to one arrangement of this invention, the tool carrier is mounted on a cross-slide structure affording said first and second slide means, the cross-slide structure being mounted for said second movement on a slide support and there is provided a screw and nut device adapted to be actuated by said manual or automatic drive means and connected to said cross-slide structure to move it in said second movement along the slide support. The screw and nut device is connected to the slide structure through opposed resilient devices which permit limited relative movement between the slide structure and one element of the screw and nut device and which urge the slide structure to a mid position of said limited relative movement.

The cam and follower means comprises a follower connected to move both the slide structure and a rotating cam connected to rotate with the workpiece and mounted in fixed relation to said slide support, and in the movement of the slide structure due to the screw and nut device, the follower comes into engagement with the rotating cam and imparts a cyclic movement to the slide structure against the action of the resilient devices.

Figure 1E:
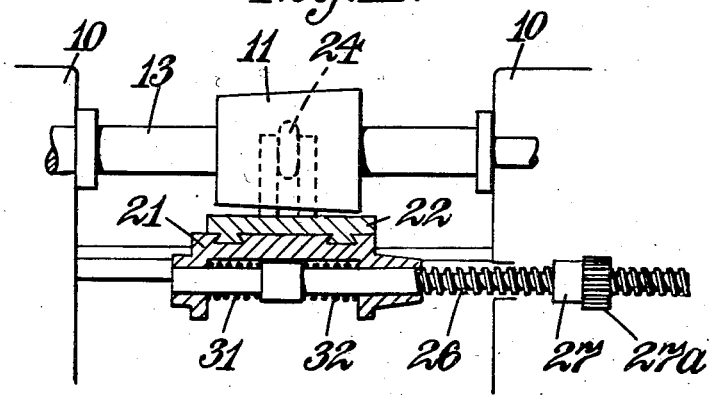

A preferred embodiment of cam turning apparatus in accordance with the present invention is illustrated diagrammatically in the accompanying drawings in which:

Figure 1 is a plan view of the apparatus,

Figures 1A and 1B are views showing different positions of parts of the apparatus illustrated in Figure 1, Figure 1C is a view in the direction of arrow C in Figure 1B illustrating the co-operating of parts of the machine, Figure 1D is a sectional view in the direction of the arrows 1D—1D of Figure 1, Figure 1E is a sectional view in the direction of the arrows 1E—1E of Figure 1D, and Figure 2 shows diagrammatically blading having inclined platforms.

Referring to Figure 1 the apparatus comprises a base structure generally indicated at 10 in which a master profile 11 and a workpiece (a turbine blade) 12 are mounted for rotation about parallel axes. There is provided a shaft 13 to carry the master profile 11 and the shaft 13 is driven from an external source of power through drive shaft 14. A workpiece supporting arbor 15 is provided and a drive is transmitted to the workpiece supporting arbor 15 through spur wheel 16, idler gear 17, and spur wheel 18. The spur wheel 18 is carried on a shaft 19 which rotates with the arbor 15. The spur wheels 16, 18 are similar so that with this drive arrangement, the master profile 11 and turbine blade 12 rotate in unison and in the same sense.

The base structure 10 has mounted on it a cross-slide arrangement to support a tool carrier 20. The cross-slide arrangement includes a lower slide structure 21 mounted on the base 10 for sliding movement in a direction substantially parallel to the axes of rotation of the master profile 11 and workpiece 12, and an upper slide structure 22 which is slidably mounted on the lower slide structure 21 for movement in a direction substantially transverse to, say at right angles to, the rotational axes of the workpiece and master profile. The upper slide structure moves against a resilient load afforded by compression springs 22A arranged between it and the lower slide structure. The tool carrier 20 is slidably mounted in the upper slide structure 22 and a hand-feed 23 is provided for initial setting of the tool. A pair of tools 25 are fixed in the tool carrier 20. The upper slide structure 22 also has mounted on it a follower 24 which co-operates with the master profile 11.

With the slide arrangement above described the relative movements of the cutting tool 25 and workpiece 12 are correlated with the relative movements of the master profile 11 and follower 24 in both senses of movement, i. e. in directions parallel to and transversely of the axes of rotation of the master profile 11 and the workpiece 12.

The movement of the tool 25 parallel to the axes of rotation of the workpiece 12 and master profile 11 is effected by means of a lead-screw 26 and lead-screw nut 27. The lead-screw nut 27 can be driven either manually through the hand-wheel 28 or automatically through the spur wheel 29 and gear 30 which can be moved axially into engagement with gear 27A integral with the lead-screw nut 27.

The lead-screw 26 engages in the lower slide structure 21 with provision for relative axial sliding movement under the restraint of opposed springs 31 and 32. The lead-screw 26 is held against rotation in the lower slide structure 21, and the springs 31 and 32 thus constitute a resilient connection in the drive from the lead-screw to the lower slide structure 21.

The lower slide structure 21 additionally carries a slide bar 33, which as will best be seen from Figure 1C lies below the shaft 19 and arbor 15. This slide bar transmits the motion of the lower slide structure 21 to cam follower means in the form of rollers 34 and 35, which rollers co-operate with double-faced cam means 36 carried by and rotating with the shaft 19. Thus when one of the rollers 34, 35 contacts one or other of the cam faces of the cam means 36 a sliding movement is transmitted through the slide bar 33 to move the slide structure 21 relative to the lead-screw 26 against the load exerted by spring 32 or by spring 31. It will be noted that since the cam means 36 rotates in time with the shaft 19, the cycle of relative movements of the cutting tool 25 with respect to the workpiece 12 and to the follower 24 relative to the master profile 11 due to the cam means 36 occurs once per revolution of the workpiece 12.

The apparatus described is particularly useful for the machining of the outside aerofoil shape of turbine or compressor blades having inclined platforms as shown in Figure 2. The blade blank includes a root fitting attachment 40, a root platform surface 41 and a tip platform surface 42. Hitherto a cam turning profile machine has been used to machine the blade profile portion indicated at A lying between the planes X—X and Y—Y at right angles to the axis of rotation Z—Z of the blade, and substantially triangular portions of the blade profile as indicated at B and B' have been left for subsequent machining by other methods. Apparatus according to the present invention enables machining of the substantially triangular portions B and B' of the blade profile to be completed in a single machining operation with the machining of the portion A.

Referring to Figure 1A, it will be seen that the roller 35 is in contact with the right-hand face of the double-faced cams means 36 and the cutting tool 25 is machining the portion of the blade corresponding to the portion B in Figure 2. The shape of the cam surface is chosen so that in rotation of the blade the tool travels substantially parallel to the plane of the root platform surface 41. It will be noted that the master profile 11 can be contoured to give the desired profile of the portion B of the blade since the master profile follower 24 moves with the tool 25.

In Figure 1B and 1C, the roller 34 contacts the left-hand face of the cam means 36 and the tool 25 is machining the portion of the profile corresponding to portion B' in Figure 2. The cutting point of the tool is reversed. To facilitate a reversal of the tool, the tool carrier 20 is preferably provided with a quick-release handle 43 enabling a tool support to be turned through 180° to present the second tool 25 to the workpiece 12.

If desired two or more blades may be machined at one time. For instance two workpieces may be supported on the arbor 15 on diametrically opposite positions and in this case the cam 36 will be arranged to produce the appropriate cycle of movements for each revolution of the arbor 15.

I claim:

1. Machining apparatus comprising base structure; a rotatable master profile rotatably supported on said base structure for rotation about an axis; rotatable work holder means mounted on said base structure for rotation about an axis parallel to that of the master profile and adapted to hold a workpiece in operation of the apparatus; a profile follower co-operating with the master profile to partake of movements determined by the master profile; a tool carrier; a compound slide structure mounted on the base structure and supporting the tool carrier, said compound slide structure comprising a first slide connected with said master profile and profile follower and movable towards and away from the axis of rotation of the workpiece under control of the follower and master profile on rotation of the master profile, and a second slide movable substantially parallel to the axis of rotation of the workpiece, one of said slides carrying the other slide; a screw and nut device having a nut element and a screw element, one of said elements being mounted in the base structure and being movable in the direction of movement of said second slide and the other element being rotatable on the said one of the elements and effecting its movement in the direction of the second slide, resilient means which is resilient in the direction of movement of the second slide and interconnects said one element and said second slide transmits movements of said one element to said second slide and permits limited relative movement therebetween in a direction parallel to the axis of rotation of the workpiece; cam means connected with the work-holder means and driven in accordance with the rotation of the work-holder means; and cam follower means connected to the second slide to move with the second slide, said cam follower means being located to come into abutment with said cam means when the second slide reaches a selected position during its movement parallel to the axis of rotation of the work-holder means, said cam means engaging said cam follower means at said selected position of the second slide and imparting to said cam follower means and to said second slide against the restraint of the resilient means, a cyclic movement in said direction parallel to the axis of rotation of the workpiece.

2. Machining apparatus as claimed in claim 1 wherein said cam follower means comprises a pair of cam follower elements which are spaced apart on the second slide in a direction parallel to the axis of rotation of the work-holder means, and said cam means comprises two cam surfaces, one to be engaged by one of said follower elements at a first selected position of said second slide during movement parallel to the axis of rotation of the work-holder means and the other to be engaged by the other of said follower elements at a second selected position of said second slide during said movement, and wherein said second slide has a pair of abutment surfaces facing one another, and said one element of the screw and nut device is positioned between said abutment surfaces and has a pair of corresponding abutment surfaces facing respectively the abutment surfaces on the second slide, and the resilient means comprises a pair of springs, each spring extending between one of the abutment surfaces on the second slide and the facing abutment surface on said one element, the springs urging the slide structure to a mid-position of said limited movement.

3. Machining apparatus as claimed in claim 1 wherein said cam follower means comprises a pair of cam follower elements mounted on the second slide in spaced relation in the direction of said second movement and the cam means comprises a rotating cam disposed between said cam follower elements and having a pair of oppositely-facing cam surfaces, the one face to be engaged by the one follower element at a first selected position of second slide during its said movement parallel to the axis of rotation of the work-holder means and the other face to be engaged by the other follower element at a second selected position of second slide during its movement.

4. Machining apparatus comprising base structure; a rotatable master profile rotatably supported on said base structure for rotation about an axis; work-holder means rotatably supported on said base structure for rotation about an axis parallel to that of the master profile and adapted to hold the workpiece in operation of the apparatus; a profile follower co-operating with the master profile to partake of movements determined by the master profile; a tool carrier; a first slide having the profile follower and the tool carrier mounted thereon and being movable in a direction at right-angles to the axes of rotation of the master profile and the workholder means under the control of the master profile and the profile follower; a second slide slidably mounted in said base structure and movable in a direction parallel to said axes of rotation, said second slide having the first slide mounted thereon; a screw and nut device having a nut element and a screw element, said screw element being held against rotation and being mounted in said base structure to move in a direction parallel to said axes of rotation, and said nut element being rotatable, engaging the screw element, and effecting on rotation said movement of the screw element; resilient means which is resilient in the direction of movement of the second slide, which interconnects said second slide and said screw element to transmit movements of said screw element to said second slide and which permits limited relative movement between said second slide and said screw element in a direction parallel to said axes of rotation; rotatable cam means connected to rotate in accordance with the rotation of the work-holder means; cam follower means connected to move with said second slide and located to come into co-operating abutment with said cam means when said second slide reaches a selected position during its movement parallel to said axes of rotation, said follower means and the cam means when in co-operating abutment imparting to said second slide a cyclic movement in the direction parallel to said axes of rotation about the restraint of the resilient means.

5. Machining apparatus comprising base structure; a rotatable master profile rotatably supported on said base structure for rotation about an axis; work-holder means rotatably supported on said base structure for rotation about an axis parallel to that of the master profile and adapted to hold the workpiece in operation of the apparatus; a profile follower co-operating with the master profile to partake of movements determined by the master profile; a tool carrier; a first slide having the profile follower and the tool carrier mounted thereon and being movable in a direction at right angles to the axes of rotation of the master profile and the work-holder means under the control of the master profile and follower; a second slide slidably mounted in the base structure to move in a direction parallel to the axis of rotation of the work-holder means and having the first slide mounted thereon; a screw and nut device having a nut element and a screw element, said screw element being held against rotation and being mounted in the base structure to move in a direction parallel to the axis of rotation of the work-holder means, and said nut element being rotatable, engaging the screw element and on rotation effecting said movement of the screw element; resilient means comprising opposed springs interposed between said screw element and said second slide transmitting movements of said screw element to the second slide and permitting limited relative movement between said screw element and said second slide in a direction parallel to the axis of rotation of the work-holder means; a cam having a pair of oppositely-facing cam surfaces, said cam being connected to rotate in accordance with the rotation of the work-holder means; a pair of cam followers connected to move with the second slide and spaced apart on the second slide in the direction of movement of the second slide, one of said cam followers contacting one of said cam surfaces when the second slide reaches a first selected position during its movement parallel to the axis of rotation of said work-holder means, and the other of said cam followers contacting the other of said cam surfaces when the second slide reaches a second selected position during said movement, each cam follower and its associated cam surface when in contact co-operating and imparting a cyclic movement to said second slide in the direction parallel to the axis of rotation of the work-holder means against the restraint of the resilient means.

References Cited in the file of this patent

UNITED STATES PATENTS

| | | |
|---|---|---|
| 1,454,554 | Mitchell | May 8, 1923 |
| 1,500,637 | Pillar | July 8, 1924 |
| 2,276,260 | Turrettini | Mar. 10, 1942 |
| 2,410,443 | Hoffer | Nov. 5, 1946 |
| 2,585,329 | Johnson | Feb. 12, 1952 |
| 2,590,224 | Armstrong | Mar. 25, 1952 |
| 2,656,651 | Seyferth | Oct. 27, 1953 |